ELECTRONIC BRANCHING CIRCUIT

Filed Aug. 17, 1961

INVENTOR.
LEO K. LUGTEN

BY C. A. Gullbrandsen
ATTY.

United States Patent Office 3,258,536
Patented June 28, 1966

3,258,536

ELECTRONIC BRANCHING CIRCUIT

Leonardus K. Lugten, Los Altos, Calif., assignor to Automatic Electric Laboratories, Inc., Northlake, Ill., a corporation of Delaware Filed Aug. 17, 1961, Ser. No. 132,186
2 Claims. (Cl. 179—15)

This invention relates to electronic branching circuits and more particularly to bidirectional communication apparatus.

Prior arrangements devolved to obtain the objects of this invention are subject to interference by crosstalk and require the use of expensive elements such as balanced bridges and special transistors.

Accordingly an object of this invention is to provide an electronic branching circuit free from cross-talk between channels.

Another object is to obtain an electronic branching circuit using conventional and inexpensive elements.

A feature of this invention is the use of transistors as switches in the transmission channels in an arrangement such that at least one channel is open at all times.

Another feature includes the use of two branching circuits with two one way amplifiers oppositely arranged and interposed between the branching circuits in a four wire communications system.

A further feature comprises the use of the electronic branching circuit in a loop circuit for telephone communications with the branching circuit contained in each subset.

Figure 1:
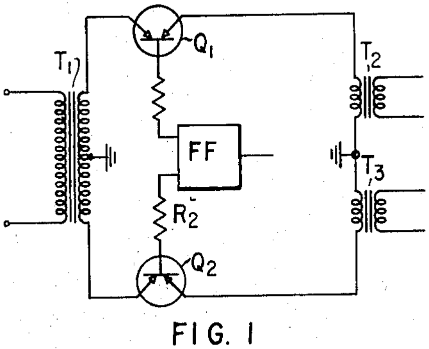
Figure 2:
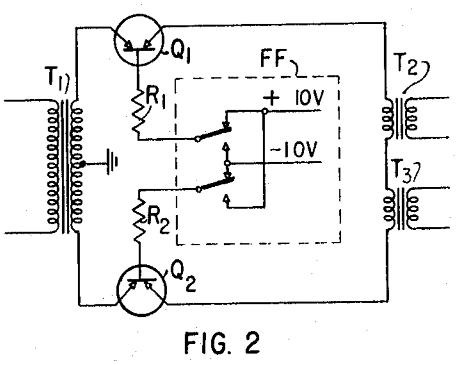
Figure 3:
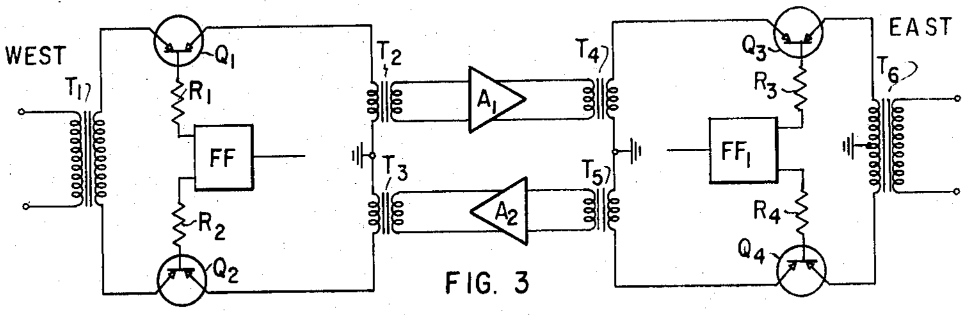
Figure 4:
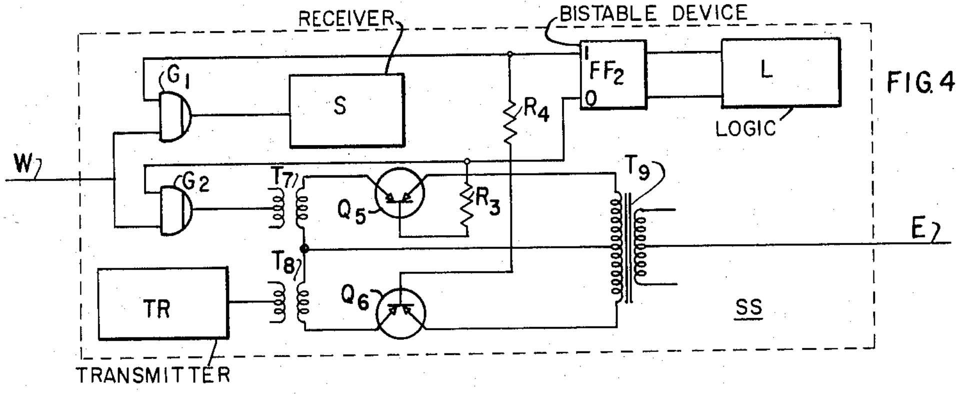
Figure 5:
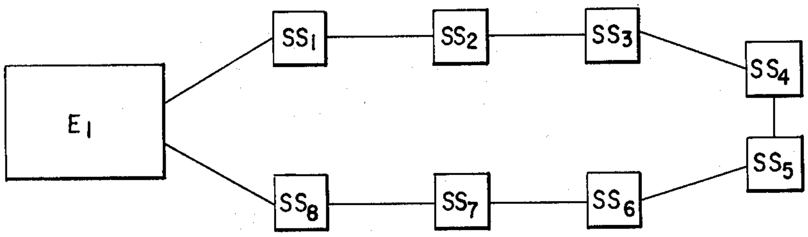

Other objects and features will become apparent upon studying the following specification with accompanying drawings in which:

FIG. 1 is an electronic branching circuit;
FIG. 2 is an electronic branching circuit;
FIG. 3 is an electronic hybrid circuit;
FIG. 4 is the circuit of a telephone subset; and
FIG. 5 is the circuit of a time division multiplex communication system.

The electronic branching circuit of FIG. 1 is a building block providing first and second paths for electrical signals and includes transformers $T_1$, $T_2$ and $T_3$, bilateral transistors $Q_1$ and $Q_2$, resistors $R_1$ and $R_2$, and a bistable circuit FF.

This branching circuit comprises a junction between a communications channel at transformer $T_1$ and one of two other communications channels at transformer $T_1$ and one of two other communications channels at transformer $T_2$ or $T_3$. The circuit is arranged so that there is a low impedance path from the first communication channel through only one of the transistors $Q_1$ or $Q_2$ to one of the other two channels at all times.

Said first path for electrical signals extends through transistor $Q_1$ between transformers $T_1$ and $T_2$ and said second path for electrical signals extends through transistor $Q_2$ between transformers $T_1$ and $T_3$.

These transistors may be thought of as impedances for the purpose of this explanation. Thus, a transistor presents a low impedance to electrical signals when saturated and a high impedance when cut off.

When transistor $Q_1$ is saturated there is a low impedance signal path between transformer $T_1$ and transformer $T_2$, and if transistor $Q_2$ is cut off then the signal path between transformer $T_1$ and transformer $T_3$ is a very high impedance.

Whether a particular transistor is cut off or saturated is determined in this circuit by the type of transistor used, NPN or PNP, and the voltage applied to the base lead of said transistor. Assume PNP transistors. Transistors of this type will be saturated when a large negative voltage is applied to the base lead and will be cut off when a large positive voltage is applied to the base lead. This would be opposite if NPN transistors were used.

Transistors $Q_1$ and $Q_2$ each have two emitter-collector electrodes and a base electrode with leads connected to each electrode.

The first and second emitter-collector leads of $Q_1$ are coupled respectivey to one side of the second winding of transformer $T_1$ and one side of the first winding of transformer $T_2$.

The first and second emitter-collector leads of $Q_2$ are coupled respectively to the other side of the second winding of transformer $T_1$ and one side of the first winding of transformer $T_3$.

A center-tap on the second winding of transformer $T_1$ is grounded.

The base leads of transistors $Q_1$ and $Q_2$ are connected through resistors $R_1$ and $R_2$ respectively to the flip-flop circuit FF. Through the flip-flop circuit, FF, opposite bias voltages are applied to the base leads of $Q_1$ and $Q_2$ such that one of the transistors is saturated and thus a low impedance and the other transistor is cut off and thus a high impedance. Under these conditions, there is a low impedance path between two transformers through the saturated transistor and a high impedance path between two transformers through the cut off transistor.

A pulse appearing at the input to the bistable switching device, FF, causes it to change from a first stable state to a second stable state. This switching reverses the polarity of the bias voltages applied to the base leads of $Q_1$ and $Q_2$ through resistors $R_1$ and $R_2$. This reversing of polarity of applied bias voltages causes both transistors to change their conduction states. Thus, if transistor $Q_1$ were saturated and thus a low impedance before said switching occurred, it would be cut off after said switching occurred and would thus provide a high impedance for signals between transformer $T_1$ and transformer $T_2$.

Since the circuit is so arranged that the two transistors are in opposite states of conductivity at all times, transistor $Q_2$ would have been cut off before said switching occurred and so will be saturated after said switching occurs. In other words before said pulse appeared at the bistable device FF, said first signal path was a low impedance and said second signal path was a high impedance while subsequent to said switching said first signal path is a high impedance and said second signal path is a low impedance.

When a continuous pulse source is used to drive the bistable circuit, FF, it changes states rapidly and thus each transistor is alternately saturated and cut off.

FIGURE 2 more clearly shows the effect of switching the bistable device from said first stable state to said second stable state. The bistable device is represented by a double pole double throw switch.

FIGURE 3 is an example of the electronic branching circuit used in a circuit analogous to a hybrid circuit.

Two branching circuits as described with reference to FIG. 1 are connected through two one way amplifiers $A_1$ and $A_2$. The flip-flop circuits FF and $FF_1$ are driven by pulse sources so arranged that at one instant there is a one way channel from West to East through T, $Q_1$, $T_2$, $A_1$, $T_4$, $Q_3$, and $T_6$ and at the next instant there is a one way channel from East to West through $T_6$, $Q_4$, $T_5$, $A_2$, $T_3$, $Q_2$, and $T_1$.

The advantage of this system is that it can pass both voice signals and pulse information with little chance for cross talk or feedback.

FIGURE 4 is a circuit for a telephone subset that is used in the time division multiplex communications system shown in FIG. 5.

The circuit of FIGURE 4 includes a transmitter, TR, a receiver, S, two transistors, $Q_5$ and $Q_6$, two "and gates," $G_1$ and $G_2$, three transformers, $T_7$, $T_8$, and $T_9$, two resistors, $R_3$ and $R_4$, a bistable circuit, $FF_2$ and a logic block, L.

Under normal conditions voltage applied to the base of transistor $Q_6$ through resistor $R_4$ from the one side of $FF_2$ is of such polarity that transistor $Q_6$ is cut off. This same voltage is applied to gate $G_1$, so that signals do not pass through said gate. Also under normal conditions the voltage applied to gate $G_2$ and through resistor $R_4$ from the zero output of $FF_2$ to the base of transistor $Q_5$ is such that gate $G_2$ is open and transistor $Q_5$ is saturated.

So, under normal conditions electric signals pass through this circuit from point W, through gate $G_2$, transformer, $T_7$, transistor, $Q_5$, and transformer, $T_9$, to point E.

Note, under these conditions no signals can pass through gate $G_1$, or transistor $Q_6$; thus transmitter TR and receiver are essentially isolated from the circuit and they have no material effect upon the electric signal passing through the circuit.

When a pulse appears at the input to the bistable circuit, $FF_1$, from the logic block, L, said bistable circuit changes from a first stable state to a second stable state and thus the voltage applied to gate $G_1$ and transistor $Q_6$ and the voltage applied to gate $G_2$ and transistor $Q_5$ are reversed in polarity. After this change occurs gate $G_1$ is open, gate $G_2$ is closed, transistor $Q_6$ is saturated and transistor $Q_5$ is cut off.

Signals appearing at point W are under these conditions received at receiver S through gate $G_1$ and signals from transmitter TR are passed through transformer $T_8$, transistor $Q_6$, and transformer $T_9$, to point E.

Note, under these conditions the signal appearing at point W cannot pass through the circuit to point E but is applied entirely to receiver S through gate $G_1$.

The above described operation is reversed by the next pulse appearing at the input to the bistable circuit, $FF_2$.

FIG. 5 is circuit of a time division multiplex communication system. This circuit comprises in a loop arrangement telephone subsets $SS_1$ through $SS_8$ and telephone exchange $E_1$.

Each of said telephone subsets comprises the circuit of FIGURE 4, and each of said subsets is assigned a specific time slot during which it can receive and transmit electrical signals. The arrangement is such that only one of said telephone subsets can receive or transmit signals at any one time.

Thus, under normal conditions electrical signals will pass through a subset without material effect. This is the condition when the bistable circuit of the particular subset as represented by the bistable circuit $FF_2$ of FIG. 4 is in its first stable state. But during the time slot assigned to the particular subset it will be in a condition represented by the second stable state of bistable circuit $FF_2$ of FIG. 4 and thus will be able to receive signals and be capable of transmitting signals.

As an example of operation, assume that a connection has been made between subset $SS_2$ and subset $SS_7$ through exchange $E_1$. During the time slot assigned to subset $SS_2$ the signals on the line in that time slot will be received at the receiver of the subset and at the same time any sginals appearing at the output of the transmitter of said subject will be placed in the same time slot. These transmitted signals in the time slot assigned to $SS_2$ will pass through all of the subsets $SS_3$ to $SS_8$ and into the exchange. The exchange will transfer the signals in the time slot $SS_2$ to the time slot assigned to $SS_7$ and transmit said signals in the time slot of $SS_7$. These signals will now pass through all of the subsets $SS_1$ to $SS_6$ and will be received at the receiver of subset $SS_7$.

A similar procedure would be followed for signals originating at subset $SS_7$ except that the exchange would transfer the signals from the time slot of $SS_7$ to the time slot of $SS_2$.

Thus the signals appearing in the time slot assigned to a particular subset can be received only by that subset and only signals originating at said subset or intended to be received at said subset can appear in the time slot assigned to said subset.

The function of the exchange after the connection is initially made is to transfer information from the time slot of the subset at which said information originated to the time slot of the subset for which said information is intended. The foregoing describes operation when both the called and calling subsets are within the same loop. However this should not be considered a limitation since either the called or the calling subset can be outside the loop and a connection can exist between them through exchange $E_1$.

While I have described above the principles of my invention in connection with specific apparatus, it is to be clearly understood that this description is made only by way of example and not as a limitation to the scope of my invention.

What is claimed is:

1. A time division multiplex communications switching system including a plurality of subsets forming a loop circuit, each said subset being associated with a separate time position, each said subset comprising:

a through-transmission path serially interposed in said loop circuit, said path including a gate circuit, a first transformer, a transistor and, a second transformer respectively connected in tandem;

a branch transmission path including transmitter means, a third transformer, a second transistor and, said second transformer respectively connected in tandem; and means for controlling the transmission condition of said transmission paths, said means including a bistable device and logic means, said bistable device being operable responsive to said logic means to enable said second transistor during only the time position associated with said subset and to enable said gate circuit and said first transistor during the remainder of said time positions.

2. A time division multiplex communications switching system, as claimed in claim 1, wherein each said subset further comprises another branch transmission path including a second gate circuit and receiver means, said receiver being connected to said second gate circuit, and wherein said control means enables said second gate circuit during only the time position associated with said subset.

References Cited by the Examiner

UNITED STATES PATENTS 2,980,769 4/1961 Lawsine ------------ 179—170

OTHER REFERENCES

Transistors, Kiver, 2nd ed., 1959, McGraw-Hill, pp. 235–239.

DAVID G. REDINBAUGH, *Primary Examiner.*

R. L. GRIFFIN, *Assistant Examiner.*